United States Patent [19]

Oizumi

[11] 4,276,980
[45] Jul. 7, 1981

[54] CONVEYOR BELT FOR CONVEYOR SYSTEM

[75] Inventor: Yoshio Oizumi, Ibaragi, Japan

[73] Assignee: Yamakyu Automatics Co., Ltd., Takatsuki, Japan

[21] Appl. No.: 76,613

[22] Filed: Sep. 18, 1979

[30] Foreign Application Priority Data

Oct. 25, 1978 [JP] Japan .......................... 53-147293[U]

[51] Int. Cl.$^3$ ............................................. B65G 17/06
[52] U.S. Cl. .................................... 198/851; 198/853
[58] Field of Search ................ 198/778, 831, 850–853, 198/844

[56] References Cited

U.S. PATENT DOCUMENTS

| 2,278,361 | 3/1942 | Rapisarda | 198/831 |
| 3,360,097 | 12/1967 | Huffman et al. | 198/778 |
| 3,651,924 | 3/1972 | Homeier et al. | 198/831 |
| 4,078,655 | 3/1978 | Roinestad | 198/778 |
| 4,222,483 | 9/1980 | Wootton et al. | 198/831 |

FOREIGN PATENT DOCUMENTS 2311537  10/1973  Fed. Rep. of Germany ........... 198/844

Primary Examiner—Joseph E. Valenza
Attorney, Agent, or Firm—Armstrong, Nikaido, Marmelstein & Kubovcik

[57] ABSTRACT

An endless belt for a conveyor system comprises a plurality of support bars (36) arranged side by side and each having a plurality of branch bars (42), (44) projecting from opposite sides thereof and formed with bores (46), (48) extending therethrough respectively. Each support bar (36) has the branch bars (42) interposed between the branch bars (44) of another support bar (36) immediately adjacent thereto, with a connecting rod (38) extending through the bores (46), (48) of the opposed branch bars (42), (44) to interconnect the adjacent support bars (36). The bores (48) are in the form of slots, rendering the support bars (36) movable longitudinally of the belt and angularly shiftable relative to each other.

4 Claims, 7 Drawing Figures

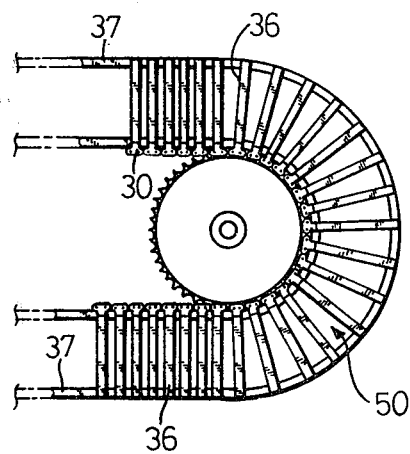
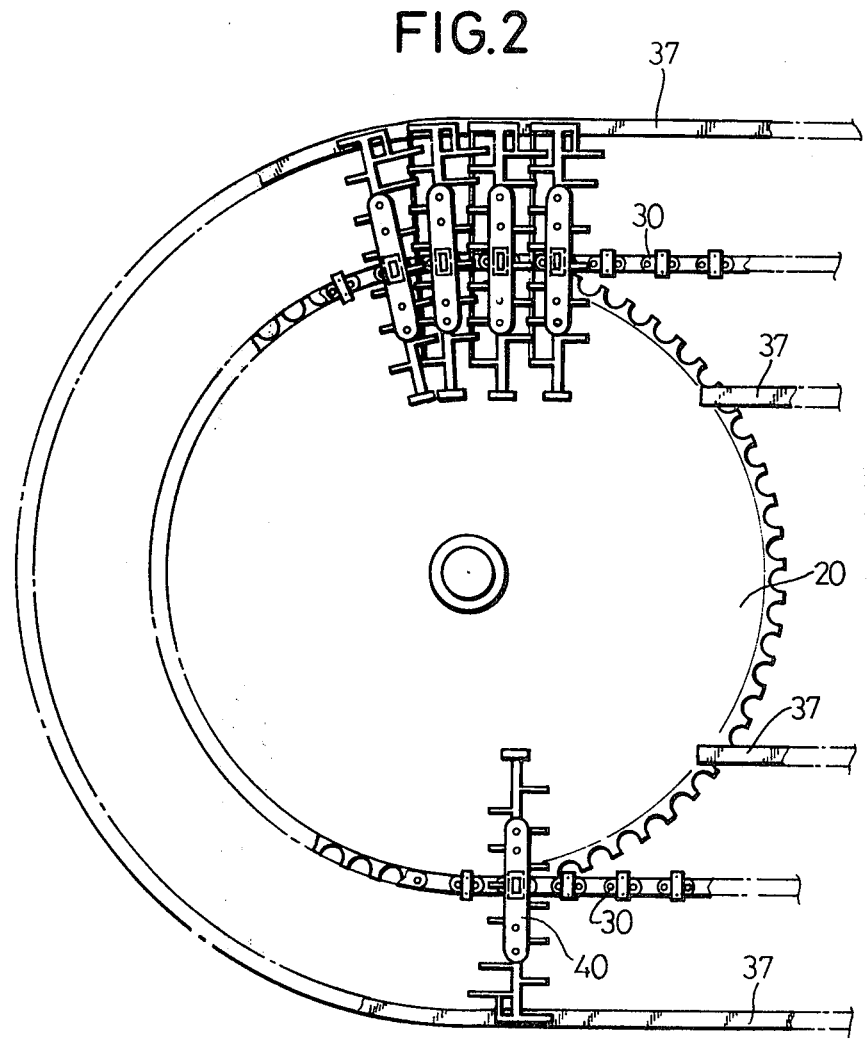

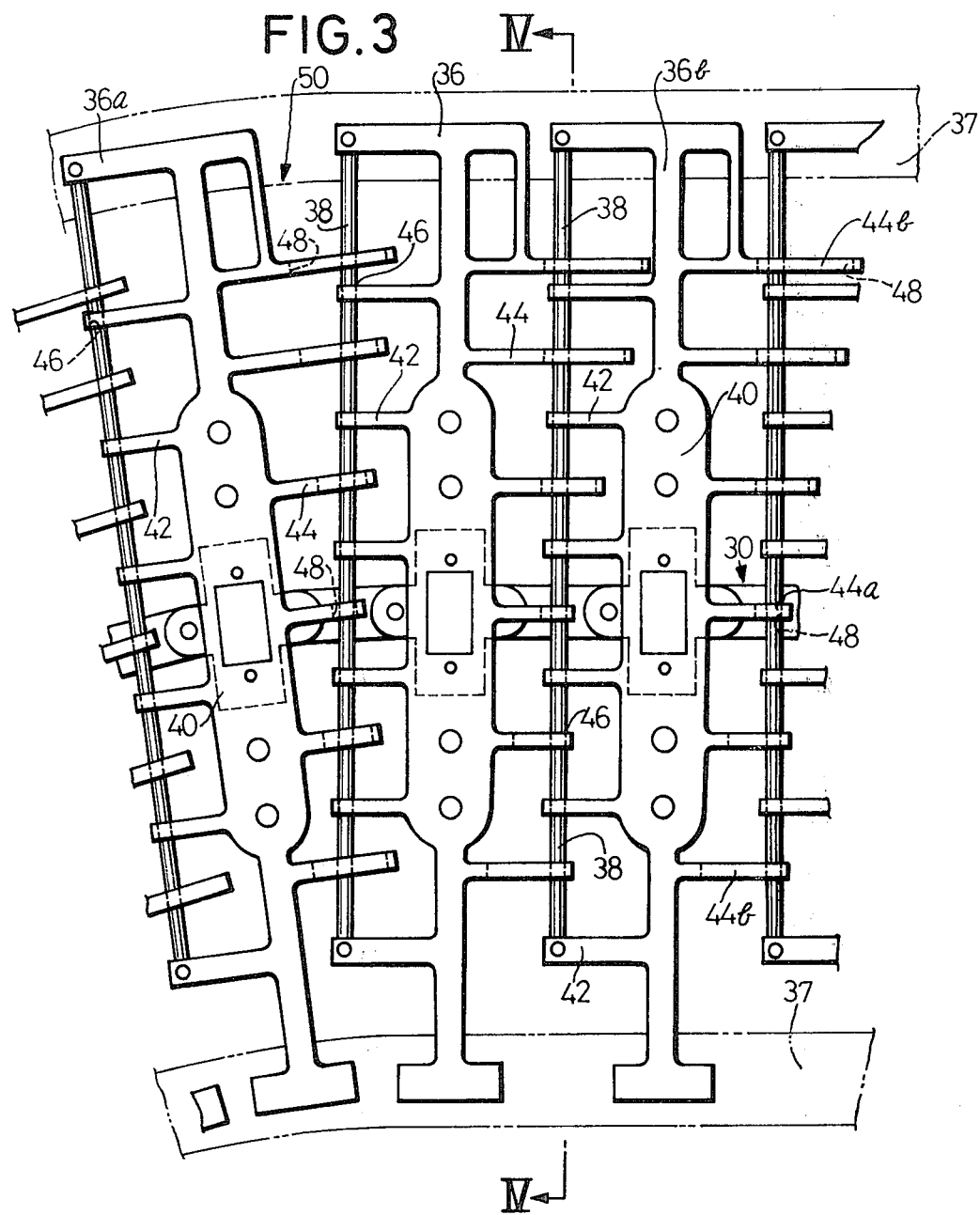

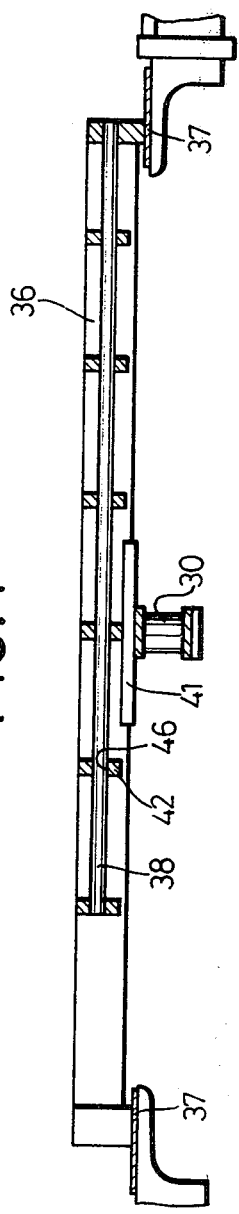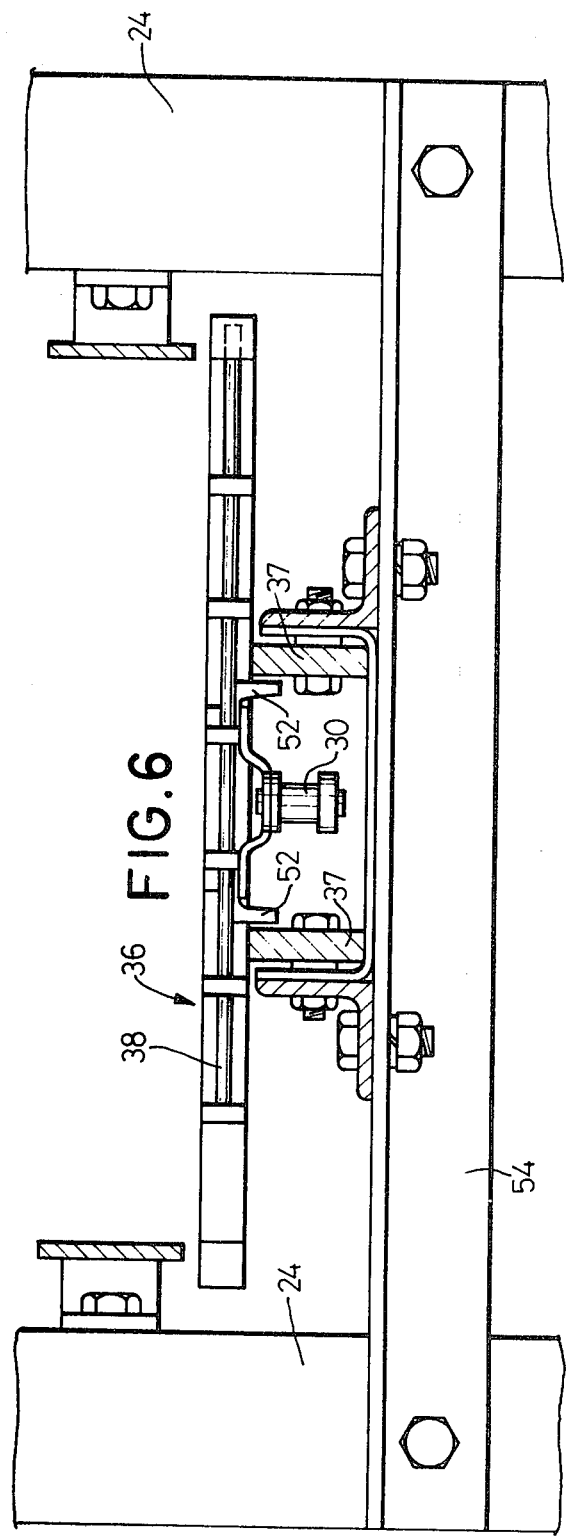

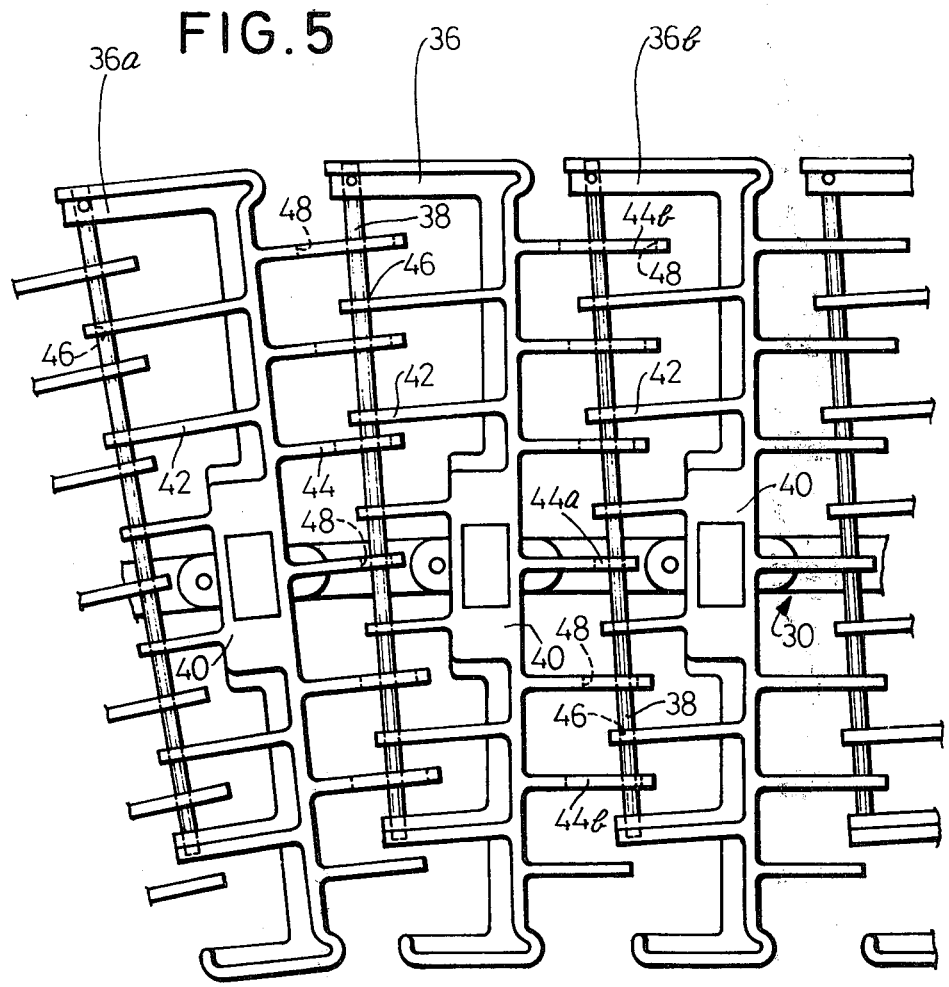

CONVEYOR BELT FOR CONVEYOR SYSTEM

BACKGROUND OF THE INVENTION

The present invention relates to a conveyor belt for conveyor systems adapted to circulate through processing apparatus.

For processing foods by quick freezing with a freezer, the processing chamber as indicated at 10 in FIG. 1 is usually equipped with a conveyor system having a conveyor belt. The belt comprises a spirally ascending conveyor section 32 and a spirally descending conveyor section 34 which are connected into an endless form at the upper end of the ascending path and at the lower end of the descending path so that articles can be passed through the processing chamber 10 over a sufficient period of time.

As shown in FIG. 7, the conveyor belt heretofore used for such conveyor systems comprises an endless chain 30 extending along the path of transport, support bars 36 arranged on the chain 30 at given spacing and each attached at its one end to the chain 30, and rails 37 provided along the path and supporting the opposite ends of the bars 36 thereon.

At the corner portions of the path, the support bars 36 are spread out into the shape of a fan, forming enlarged spaces 50 between the bars 36 and entailing the likelihood that loose articles on the belt will fall off. Furthermore the load of an article during transport acts concentrically on the support bars 36 which carry the article and is not supported by adjacent bars, so that the support bars which are subjected to great load are liable to bend. Thus the conventional belt involves various problems.

SUMMARY OF THE INVENTION

The main object of the present invention is to overcome these problems and provide a conveyor belt which retains relatively small spaces even at corner portions and which is adapted to support the weight of the articles placed thereon evenly over an area beneath and around the articles without being locally subjected to the load concentrically.

BRIEF DESCRIPTION OF THE DRAWING

FIG. 2 is a plan view showing a corner portion of the belt;

FIG. 3 is a plan view showing support bars as mounted in place;

FIG. 4 is a view in section taken along the line IV—IV in FIG. 3;

FIG. 5 is a plan view showing another embodiment of the conveyor belt;

FIG. 6 is a view in section taken along the line VI—VI in FIG. 5; and

FIG. 7 is a plan view showing part of a conventional belt.

DETAILED DESCRIPTION

Figure 1:
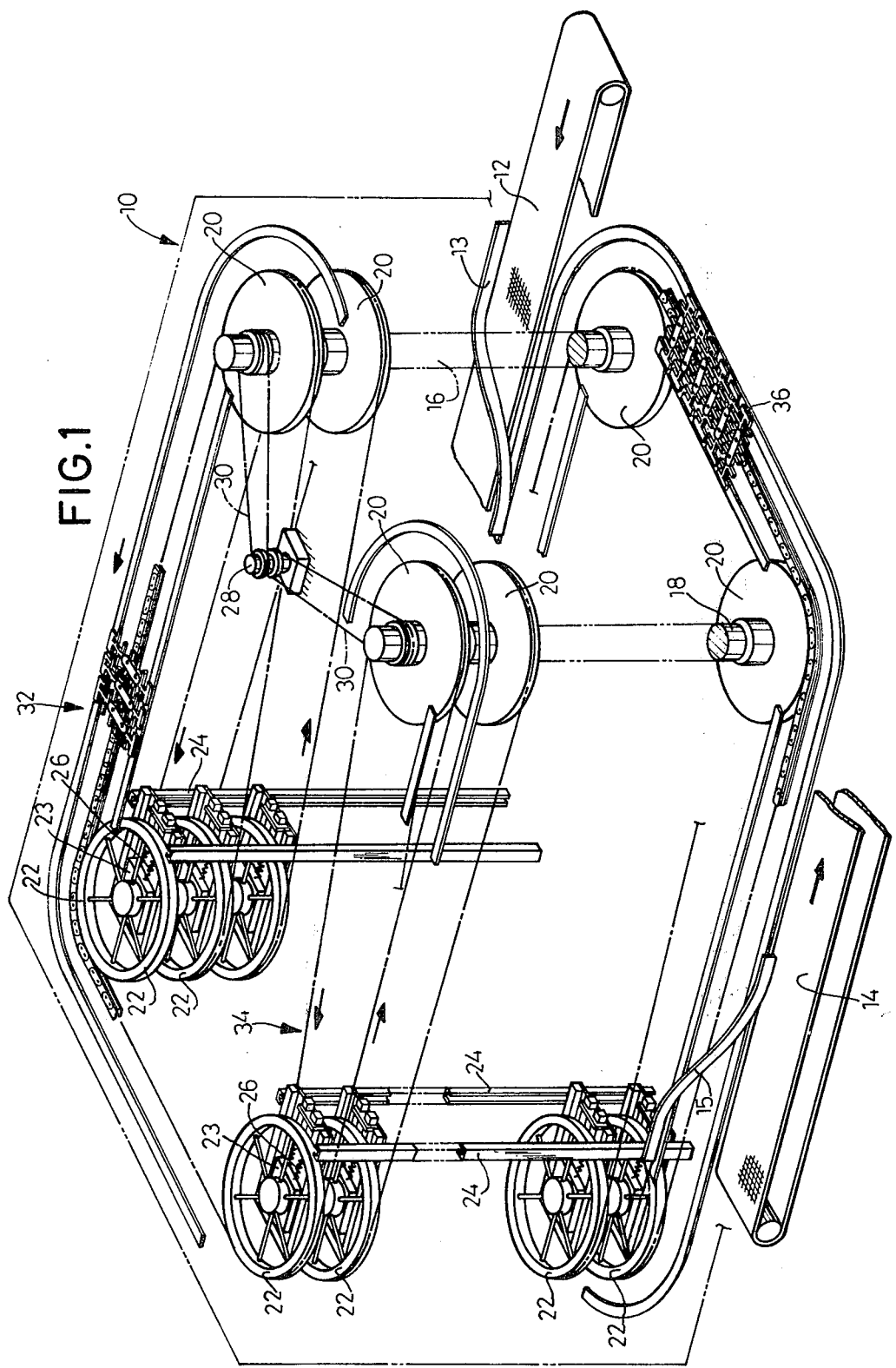
FIG. 1 is a perspective view showing a conveyor belt of the invention as installed in a conveyor system.

The conveyor belt of this invention will be described below with reference to the drawings as it is adapted for a conveyor system for use in freezing foods, but the belt is of course usable for various other conveyor systems.

A processing chamber 10 is provided with a conveyor 12 for feeding unprocessed food to the chamber and with a conveyor 14 for discharging the food from the chamber after freezing.

Two upright drive shafts 16 and 18 are arranged side by side in the processing chamber 10, with a plurality of drive wheels 20 mounted on each of the shafts at equal spacing. Disposed in the processing chamber 10 away from the drive shafts 16 and 18 are frames 24 provided with movable support members 23 rotatably carrying driven wheels 22. The driven wheels 22 are spaced vertically each as shifted from the level of the corresponding one of the drive wheels by one-half pitch. The movable support members 23 are slidably mounted on the frames 24 and biased outward by springs 26. The drive shafts 16 and 18 are coupled at their upper ends with drive means 28 on the chamber 10 by chains 30 to rotate the drive wheels 20 on the shafts 16 and 18 in the same direction at the same time.

Also disposed in the processing chamber 10 adjacent the feed conveyor 12 is a conveyor belt which is reeved around the drive and driven wheels 20 and 22 alternately to provide a spirally ascending conveyor section 32. Similarly disposed adjacent the discharge conveyor 14 is a conveyor belt which is reeved around the drive and driven wheels 20 and 22 alternately to provide a spirally descending conveyor section 34. The ascending and descending sections 32 and 34 are connected together at the upper end of the ascending path and at the lower end of the descending path to provide an endless conveyor means adapted to circulate through the interior of the processing chamber 10.

As shown in FIG. 3, the conveyor belt of this invention comprises support bars 36 of substantially identical shape which are arranged side by side in meshing arrangement, with connecting rods 38 extending through the lapping portions to connect the support bars 36 into the shape of a belt.

The support bars 36 are made of synthetic resin material, such as polyamide resin reinforced with glass fiber, which is light, has a small coefficient of friction and possesses outstanding resistance to heat and low temperatures. Each of the support bars 36 has an article support portion 40 of increased width in its center and branch bars 42 and 44 projecting from opposite sides of the support portion 40, the branch bars on each side being arranged at equal spacing as shifted from those on the other side by one-half pitch. The support portion 40 and the branch bars 42 and 44 are flush with each other at the upper side to place articles thereon. The group of branch bars 42 extending from one side of the support portion 40 have substantially the same length and are formed at their free ends with bores 46 in alignment. The other group of branch bars 44 extending from the other side of the support portion 40 include a branch bar 44a having a slot 48 of the smallest length at the midportion of the support portion and longer branch bars 44b at opposite ends of the support bar 36, the slots 48 of the bars 44 thus having an increasing length toward the opposite ends. The branch bars 44 have slots 48 at their outer ends. The branch bars 44b at the opposite ends have longer slots 48 than the middle branch bar 44a.

The support bars 36 are arranged side by side. The branch bars 42 on the rear side of one support bar 36 are interposed between the branch bars 44 on the front side of another support bar 36a, with a connecting rod 38 extending through the bores 46 and the slot 48 at the lapping portions to connect the front and rear support bars 36 and 36a together losely, so that the bars are angularly shiftable relative to each other. Thus the support bars in a parallel state as indicated at 36 and 36b in FIG. 3 are continuously shiftable to the state indicated at 36 and 36a in which one bar is opened, for example through several tens of degrees, from the bar 36.

A chain 30 provided beneath the belt along the centerline thereof is flexible in a plane parallel to the plane of transport. The support bars 36 are attached to the chain elements of the chain 30.

Synthetic resin rails 37 are provided on opposite sides of the endless chain 30 which extends through the interior of the processing chamber 10. The support bars 36 are slidably supported at their opposite ends of the rails 37.

The articles successively sent forward on the feed conveyor 12 strike a feed guide 13 and are thereby forced inward onto the ascending section 32 of the belt travelling along the feed conveyor 12. The articles transferred to the belt spirally ascend the path through the section 32, reach the descending conveyor section 34 at the upper end and spirally descend. While thus circulating through the interior of the processing chamber 10 over a long period of time, the articles are frozen. At the lower end, the articles strike a discharge guide 15 and are thereby forced outward onto the discharge conveyor 14 and discharged from the chamber. Since the support bars 36 are supported at the bottom on the rails 37 over the entire path of travel, with adjoining support bars 36 interconnected by the rod 38 to support the load, the load of the article on the belt dividedly on the support bars 36 and accordingly will not bend the bars 36. Further because each two adjacent support bars 36 are connected together with their comb-like branch bars 42 and 44 in meshing arrangement, the bars 42 and 44 thus arranged merely shift relative to each other at the corner portions, permitting the support bars 36 to retain a relatively small space 50 therebetween to assure smooth transport of the articles at the corner portions against falling off.

FIGS. 5 and 6 show another embodiment of the support bar 36 of this invention. The support bar 36 has a support portion 40 and branch bars 42 and 44 extending from opposite sides of the portion 40. The branch bars 42 and 44 are shorter toward the inner side, with respect to a spiral path, of the belt and longer toward the outer side thereof. The support portion 40 has on its lower side stoppers 52 on opposite sides of a chain attaching portion 41.

The path of travel of the conveyor belt is provided with rail supporting brackets 54 attached to frames 24. Rails 37 disposed on the outer sides of the two stoppers 52 on the support bar 36 are mounted on the brackets 54 to slidably support the bars 36 at their bottom side. The belt comprising such support bars 36 connected together is similar to the belt of FIGS. 1 to 4 in that the branch bars 42 and 44 in meshing arrangement are merely shifted from each other at corner portions, with the result that the space between the support bars 36 will not enlarge. The load of the article on the belt acts dividedly on adjoining support bars 36.

The construction of this invention is not limited to the embodiments described above and shown in the drawings but can be modified variously by one skilled in the art without departing from the features of the invention.

I claim:

1. A conveyor belt for a conveyor system having a plurality of driving and driven wheels mounted for rotation about parallel axes with said wheels rotating in planes substantially parallel to the plane of transport of the conveyor system and a chain reeved around and interconnecting said wheels, said belt comprises a plurality of support bar means arranged side by side having top surfaces in the plane of transport and a chain attached to the support bar means beneath the plane of transport, said chain being flexible in a plane parallel to the plane of transport, each of the support bar means having a plurality of branch bars projecting from each of opposite sides thereof, each of the support bar means having one group of branch bars on one side thereof interposed in an alternating arrangement between another group of branch bars on the other side of another support bar means immediately adjacent thereto, a connecting rod fixedly extending through said one group of branch bars and loosely extending through slots formed in said another group of branch bars to interconnect the support bar means and render the support bar means movable longitudinally of the belt and turnable with respect to an adjacent support bar means in a horizontal plane within the range permitted by the loose arrangement of the connecting rod in the slots.

2. A conveyor belt as defined in claim 1 wherein the connecting rod fixedly extending through said one group of branch bars is parallel to the axis of said support bar means, and the branch bars of said other group are small in slot length at the midportion of the support bar means and are larger in slot length toward opposite ends of the support bar means.

3. A conveyor belt as defined in claim 1 wherein the connecting rod fixedly extending through said one group of branch bars is at an acute angle with respect to the axis of said support bar means, and the branch bars of said other group are small in slot length at the midportion of the support bar means and larger in slot length toward opposite ends of the support bar means.

4. A conveyor belt as defined in claim 1 wherein the support bar means are attached to side face elements of said chain.

* * * * *